Aug. 5, 1930.                A. ABEL                1,772,410
       METHOD AND DEVICE FOR PRODUCING STROBOSCOPIC LIGHT EFFECTS
              Filed Oct. 24, 1929        3 Sheets-Sheet 1
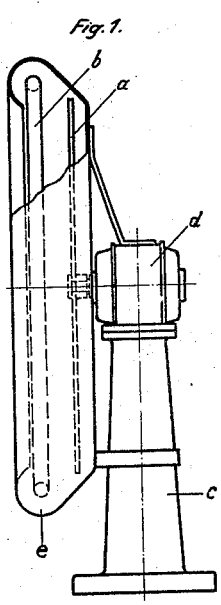
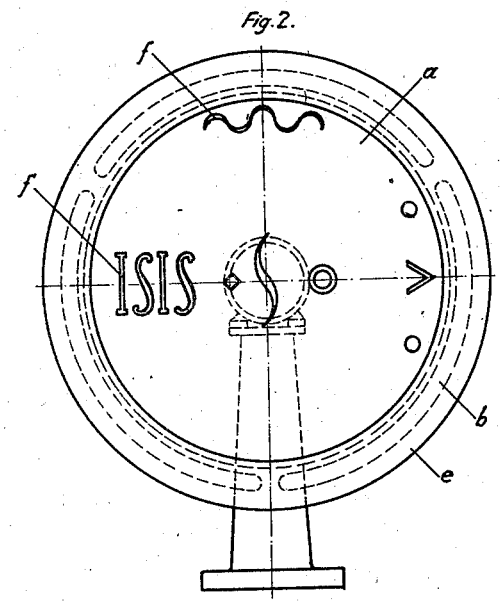
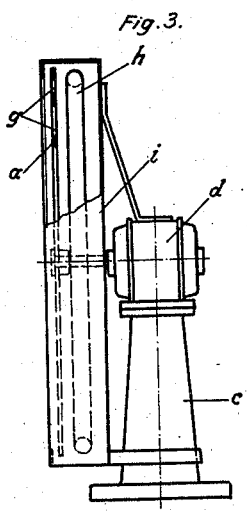
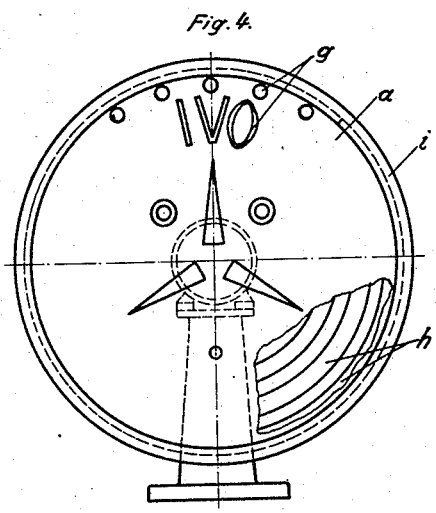
Inventor:
August Abel
By Dowell and Dowell
Attorneys

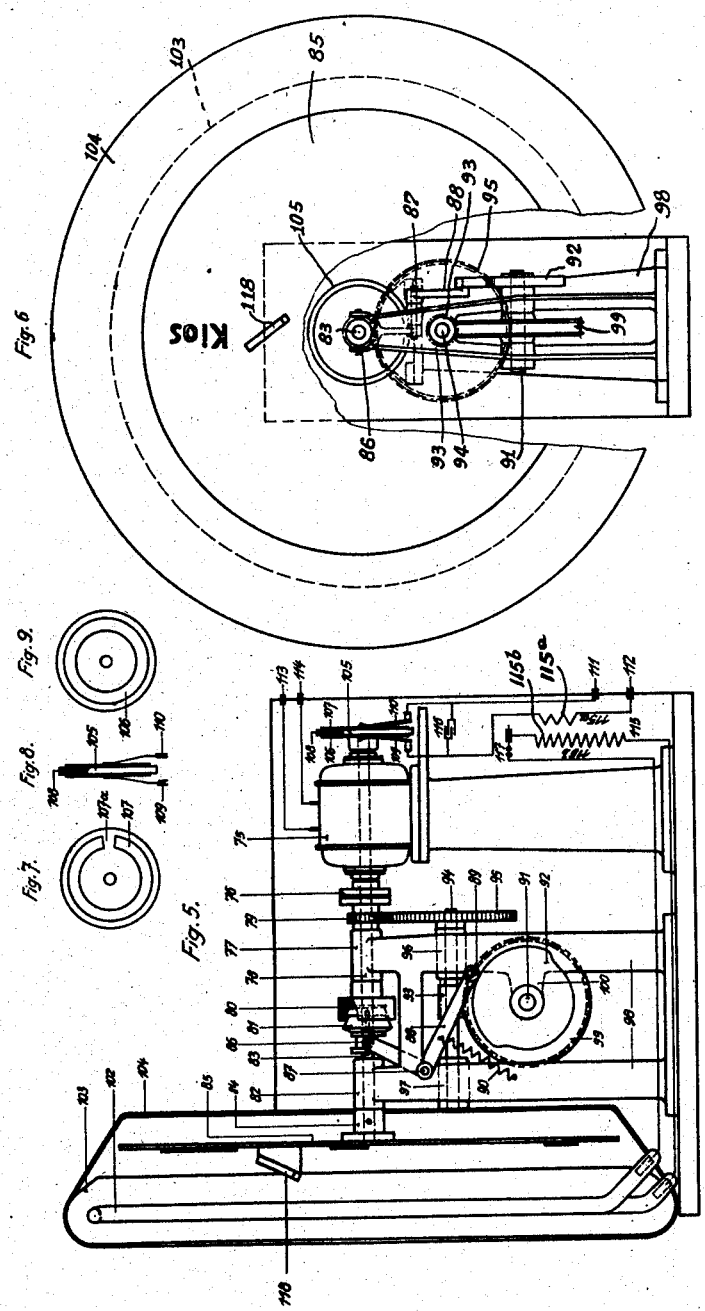

Aug. 5, 1930.                A. ABEL                1,772,410
            METHOD AND DEVICE FOR PRODUCING STROBOSCOPIC LIGHT EFFECTS
                        Filed Oct. 24, 1929    3 Sheets-Sheet 3
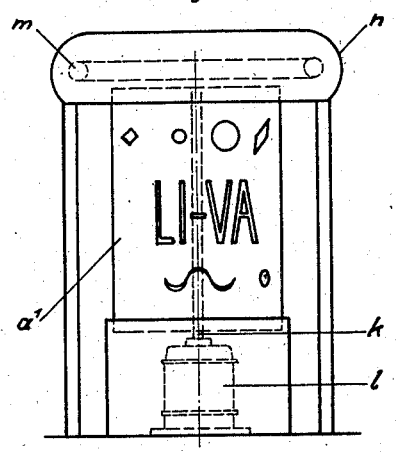
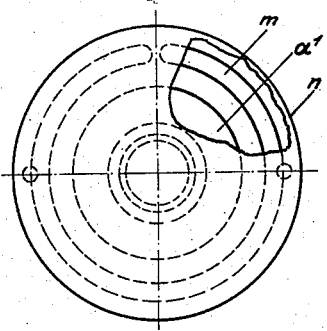
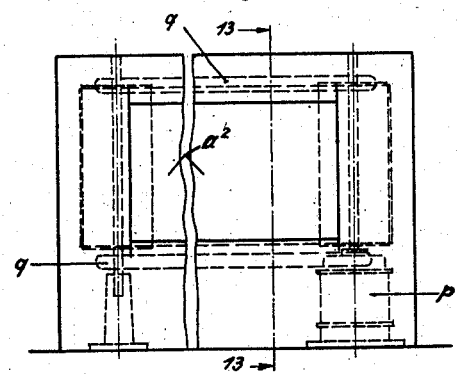
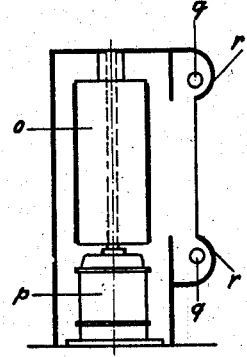
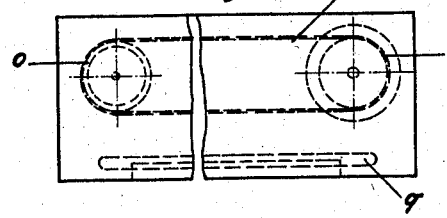

Patented Aug. 5, 1930

1,772,410

UNITED STATES PATENT OFFICE

AUGUST ABEL, OF LEIPZIG, GERMANY

METHOD AND DEVICE FOR PRODUCING STROBOSCOPIC LIGHT EFFECTS

Application filed October 24, 1929, Serial No. 402,251, and in Germany September 27, 1928.

This invention relates to methods and means for producing stroboscopic light effects and aims to provide important and novel improvements in the same.

It is a known fact that inertialess sources of light such as Geissler-tubes or neon-tubes which are illuminated by individual electric impulses, produce stroboscopic light effects when set into correspondingly quick rotation. Numerous attempts however to utilize this phenomenon for advertising purposes and to cause high frequency tubes to act in the desired sense have failed to produce the desired results owing to the low intensity of light. In effort to surmount this difficulty, large neon-tubes were tried, but these were found to be dangerous on account of the feed of high tension alternating current to the quickly rotating tubes over ordinary brush contacts and owing to the risk of the fragile glass tubes breaking under the influence of centrifugal force set up by the quick rotation. To all this must be added the disadvantage of the unreliable affixture of the glass tubes to their carriers, as the great differences of temperature and consequent expansion which occur render a reliable manner of fixing very difficult. The risk of accidents from bursting of the quickly rotating tubes could not be eliminated with sufficient certainty.

The invention aims to provide new ways and means of producing stroboscopic effects of a kind which are particularly suited to advertising purposes and which entirely eliminate the aforesaid dangers and objections. The invention provides means to achieve the purpose with absolute certainty and moreover offers a much wider scope of development of stroboscopic effects for advertising purposes than has been the case with the known devices above referred to.

For the purpose of producing said advantages, the invention broadly consists in a new method of producing constantly changing stroboscopic advertising display by illuminating, within an intermittent luminous field, a body of suitable shape and carrying pictorial elements or advertising matter, by means of individual flashes of light of short duration and suitable frequency, moving said body at suitable speed within the luminous field, and automatically changing the ratio of the speed of the body to the frequency of the intermittent luminous field so as to thereby produce constantly changing stroboscopic effects such as illusionary ornamental combinations, temporary forward movements, standstills and backward movements.

By the denomination "pictorial elements", parts of ornaments or figure representations are intended to be understood, which elements are arranged disconnected from each other upon the carrier and which, during their movement according to the invention appear to flow or merge together into complete figures or ornamental combinations. These representations may consist of impervious or transparent surface designs, or may be formed by plastic body representations. The object of the new method will in all cases be the production of surprising and constantly changing stroboscopic effects produced by automatic variations in the ratio of the speed of the carrier to the frequency of the intermittent luminous field.

This new method, according to the invention, is carried into effect by moving a body of any desired shape at appropriate speed within a luminous field which is produced by preferably inertialess and stationary intermittent sources of light, such as neon-tubes, Moore-tubes, and others illuminated by electric current impulses, say alternating current. If the said body is to be moved under infalling light, then its surface is provided with strongly light-reflecting parts, or with diffuse reflecting metallic white or colored portions such as spots, designs, ornaments, trade marks or advertising scriptive matter. If moved in penetrating light, i. e. in front of the intermittent source of light, its surface is provided with perforations, cuttings or other portions pervious to the light and which also may be in the shape of designs and the like. According to the arrangement, shape or configuration of the said surface designs or permeable portions and in accordance with the moving speed of said body (hereinafter called the carrier) and with the continuous or intermittent variations in the ratio of its movement to the sequence of the electric impulses, stroboscopic effects are produced which appear either slowly or quickly to move forward or backward, or to remain at standstill, or to multiply into varying numbers. These stroboscopic effects may also be caused to appear in colors whenever the said designs and the like, or the projected intermittent light is colored.

It is also possible, according to the invention, to move the carrier in the intermittent luminous field simultaneously or successively in several directions. Also, several divisions of the carrier or several individual carriers of the same or different kind may be moved in the same or opposite directions at even, different, or variable speeds, and the subdivided carriers to be illuminated by reflecting or penetrating light may be arranged in sequential order, or superposed as well as juxtaposed.

The reflection from or the transparency of the movable carriers may also be caused by several luminous tubes of various colors at the same or at different places, and the various colors may be caused to light up simultaneously or in alternation.

If it is desired to produce merely stroboscopic luminous effects, or color and design effects of a somewhat blurred or fading appearance, i. e. with no sharp outlines, it will be sufficient to charge the luminous tubes with sinusoidal current impulses of the alternating current, or of alternating current produced in direct current converters. However, if it is desired that the designs and, in particular, letters and words should appear in clear outlines, even at great speed of the movable carrier, it is advisable to shorten the period of the individual flashes of the electric impulses. This may be effected either by arranging a spark gap in front of the luminous tube, or, in the case of direct current, by quick interruptions as by means of a rotary mercury interrupter and subsequent transformation up to the secondary working voltage of the tube. If alternating current is employed, it may be effected by interrupting the low voltage alternating current in the most suitable moment of its period, i. e. of its amplitude, by the same means, and by likewise subsequent transformation up to the secondary voltage of the tube. The desired optimum can easily be arrived at by suitably timing the moment of interruption. In the last two instances one may, if desired, introduce a spark gap before the luminous tube.

Of the many different ways of carrying the fundamental invention into effect, several examples are illustrated diagrammatically in part, in the accompanying drawings. According to size, configuration and outfit, the various forms may be put up in shop windows, at the fronts or upon the roofs of buildings or in the open. In the latter cases, the provision of a waterproof enclosure is advisable.

Figs. 1 and 2 are side and front elevations respectively of the device for use with reflecting lights;

Figs. 3 and 4 are similar views of the device for use with transmitted light;

Fig. 5 is a side elevation of an arrangement similar to Fig. 1 with the side wall removed but including the necessary mechanical and electrical arrangements;

Fig. 6 is a front elevation of the device of Fig. 5 with part of the carrier broken away;

Figs. 7, 8 and 9 show details of parts;

Figs. 10 and 11 represent a side elevation and plan view respectively of a modified form of device in which the display surface is made in cylindrical shape; and Figs. 12, 13 and 14 illustrate different views of a device in which the carrier is made in the shape of an endless belt or apron.

Referring first and particularly to Figs. 1 and 2, the part denoted by the reference letter $a$ forms the light-reflecting body or carrier, which is in the shape of a circular disc and is adapted to rotate in a luminous field produced by the annular luminous tube $b$ arranged around its circumference. Rotation of the carrier is effected by an electric motor $d$ carried upon a common support $c$ as shown. The letter $e$ denotes a reflector encircling said luminous tube and at the same time preventing the egress of the rays of light in the direction of the observer. Instead of using only one luminous tube, several of such tubes obviously may be used in either like or different colors and adapted to be lighted all simultaneously or successively. In the latter case, an automatic switch of any well known kind would be advisable to control the lighting in proper order.

In order that the rays which are projected from the lower portion of the tube $b$ onto the disc $a$ shall not be ineffectually reflected therefrom in upward direction above the heads of the observers, but shall be frontways and sideways, it is advisable to make the surface of the said disc or carrier not entirely smooth, or in other words to make it more or less undulating by forming grooves, ribs or like elevations and depressions in the surface, which greatly favor the dispersion of the light towards all sides thereof. If desired, these elevations and depressions may be made upon a non-reflecting surface and may represent designs, ornaments or inscriptions as indicated at $f$ in Fig. 2. As an alternative, the carrier disk $a$ may be provided with designs or ornaments either in black and white, or colored, in which latter case it is preferred to choose the same colors as those reflected from the luminous tubes. By arranging the colors in progressive succession, i. e. one after the other as seen in the direction of rotation, new effects are obtained owing to stroboscopic addition at certain speeds; and by constantly changing the speed of drive, continually changing color effects and designs of a very attractive nature will be produced.

If it is desired to cause representations or, which is more important, letters or a word such as a name or a trade mark to always appear well recognizable upon the surface of the disc, the said representation or word will have to be applied radially. In accordance with varying numbers of rotation of the carrier in relation to the periodicity of the electric impulses passing through the tube, the said word or other representation will appear either singly or multiplied once or several times, and also stationary or moving forward or backward. It will, however, always be clearly readable and likewise so if arranged in annular disposition also, in which case it must not be too long since its circular track of movement should then be small and the speed of rotation on which its multiplication depends, must be chosen so that the letters of the stroboscopically multiplied word do not cover or obliterate one another. On the other hand, by suitably altering the rotary speed of the disc, one may, for a short interval, purposely obliterate the word so that when the obliteration is again removed, the sudden clearness of the outlines will come as a surprise.

As an alternative, when representations such for example as ornamentations or color designs are applied not in radial formation but in ring-shape side by side in the direction of rotation, they would seem to more or less overlap each other in accordance with the sense of rotation, and to thereby produce new designs and ornamentations, which, with the alterations in the speed, undergo constant changes. If these ornaments or designs are printed in color, color effects will be produced which can be made to undergo constant changes by altering the speed of rotation of the disc. Countless numbers of these light and color effects and varying designs are rendered possible by these stroboscopic means and their continuously changing appearances bring about most surprising effects highly desirable in advertising.

In Figs. 3 and 4 is shown an arrangement of the device for use with transmitted light. In this, as in the first arrangement, a rotating disc $a$ is employed as the carrier, but whereas the same in the first example is arranged to rotate at the rear of the luminous field, it is in this case rotated in front of said field and formed with perforate or transparent portions $g$ representing letters, ornaments, words, or the like as before described. The luminous field is provided by a vertical grate-like arrangement of luminous tubes $h$, or by a spirally wound or star-shaped tube, which may be either white or colored in one or several colors. In the case of a grate-like arrangement of the tubes, they may be so disposed, for example, as to have three juxtaposed or superposed groups of different colors, while with a spiral formation of the tubes such as represented in Fig. 4, the inner circle, the outer circle, and the intermediate coils may be each of a different color. A radial or star-shaped arrangement of tubes would preferably have the arms or sectors in different colors. Briefly, it may be said that the appropriate color arrangement in each case would depend upon the kind of transparent designs employed and upon the color effects which it is desired to produce. At the back of the luminous tubes $h$ is provided a reflector $i$, but otherwise the organization is the same as already described with reference to Figs. 1 and 2. Obviously, this novel stroboscopic light advertising device may be combined with or brought into alternate action with any other electric light advertising devices. For instance, an electric light sign composed of lamps or tubes may be arranged around the stroboscopic display field so as to switch on when the stroboscopic device is turned out, and vice versa.

As aforesaid, the variation in ratio between the speed of the carrier and the frequency of the luminous field may be brought about in several ways. According to Figs. 5 and 6, this variation is effected by mechanical means, including a friction-clutch for temporarily declutching the disc-shaped carrier (corresponding to $a$ of the preceding figures) from its driving electric motor so that the rotary speed thereof will fall off quickly, while the frequency of the luminous field remains constant. This results from the fact that the revolutions of the motor, which may also drive the interrupter, are not altered. However, before the carrier reaches a standstill or its revolutions approximate the zero point, it is again automatically clutched to its driving motor, so that the revolutions will immediately begin to increase in number.

In the last mentioned two figures, the reference numeral 75 denotes the electric driving motor. At one end of the motor shaft is a coupling 76 connecting said shaft with the speed gear shaft 78, which rotates in bearing 77. On said gear shaft at the right hand side of the bearing 77 is keyed a small pinion 79 and at the left hand side thereof is the fixed clutch member 80 of a friction cone clutch. The shaft 78 is thus rotatable continuously with the clutch member 80 thereon, while the other and loose clutch member 81 is axially displaceable by means of a key and key-way connection at one end of the carrier shaft 83 which is coaxial with the shaft 78 and is journalled in the bearing 82. The other end of the carrier shaft 83 carries the disc 85 fastened thereon by means of a detachable hub 84. The hub of the loose clutch member 81 is provided in known manner with a circumferential groove into which the yoked arm 86 of a bell crank lever 88, pivoted at 87, engages. Another roller 89 on the other arm of said bell crank lever rides under action of a compression spring 90 on the circumference of the cam 92 on shaft 91. This shaft 91 is rotated by the gear shaft 78 over a reduction gear consisting of cog and worm wheels, since the rotation of the cam 92 must be very slow as compared with the rotary speed of the driving gear shaft 78. Said reduction gear comprises the aforesaid pinion 79 which meshes with the toothed wheel 95 on a shaft 94 below and parallel to the gear shaft. The last named shaft rotates in bearings 96, 97 on the machine frame 98 and carries a worm 93 which drives a worm wheel 99 on shaft 91. The ratio of the toothed gear to the worm gear is such that the friction clutch member 81 is re-engaged always after the number of revolutions of the carrier disc 85 has come to a certain minimum value.

The picture elements and/or representations on the carrier disc 85 are illuminated by a luminous field such as already described, consisting of separate flashes of light of very short duration following each other in quick succession. According to Fig. 5, this luminous field is produced by an annular gas-filled luminous tube 102 which is arranged within an annular screen or reflector 103 preventing the projection of light rays in undesired directions. The entire apparatus is enclosed within a casing 104.

The electrical arrangement for the production of the peculiar luminous field referred to is also shown in Fig. 5, while Figs. 7, 8 and 9 illustrate the edge and opposite sides of the interrupter disc in detail. This interrupter may be of any known or convenient kind. In the drawings it is shown as of disc-shape with brush contacts. It is positioned at the right hand end of the motor shaft and consists of an insulating disc 105 having two current conducting rings 106, 107 on opposite sides which are in electrical connection with each other by means of the bridge piece 108. The inner ring 106 is closed, while the outer ring 107 is open at 107$^a$. Contact spring-brushes 109 and 110 respectively are provided to ride over the two rings. The innermost brush 109 is in permanent contact with the inner ring 106, whereas the outermost brush 110 riding over the outer ring 107 causes an interruption of the primary circuit every time it passes the break-gap 107$^a$. Connection and arrangement of the electrical devices used are shown diagrammatically for the sake of simplicity, because these parts are generally known and require no detailed illustration.

At 111 and 112 direct current, for example, may be introduced into the device for the production of the luminous field, and at 113 and 114 to the electric motor. From 111 the current is led to the contact brush 110 of the interrupter, whence it takes its way over the second contact brush 109 into the primary coil 115$^a$ of the transformer 115. Connected in parallel to the two contact brushes is a condenser 116 of suitable capacity for reducing the interrupter spark and shortening its duration of time. The secondary high tension coil 115$^b$ of the transformer leads over the spark gap 117 to the electrodes of the gas-filled luminous tube 102. Also the said spark gap 117 is chiefly employed to vary the time of duration of the quickly succeeding light flashes of the luminous tube.

It is expressly understood, that the afore-described arrangement and combination of parts in the device are given by way of example only, as other mechanical and electrical arrangements may be chosen in great variety for the purpose of varying the ratio of the speed of the carrier to the frequency of the luminous field.

If alternating current is used, the arrangements referred to in earlier parts of this specification may be employed.

The extent of the illusive effects obtainable by a device according to the invention has been described in the foregoing parts of this specification with reference to the simple arrangements of the first four figures. Other modifications may be devised as for example by forming the movable body or carrier as a cylinder, a prism, a cone, pyramid, sphere or in the shape of any other solid, and causing it to rotate either on a vertical, horizontal or an oblique axis. Figs. 10 and 11 illustrate a cylindrical formation of the carrier adapted to turn on an upright shaft. In these figures the light reflecting cylindrical body is represented at $a'$, the generating surface of which may be ornamented substantially similar to the surface of the carrier disc $a$ referred to above. Said cylinder turns on the vertical shaft $k$ while $l$ is the electric motor provided to rotate the cylinder at suitable speed. Naturally, both the cylinder and its axis may be disposed horizontally instead of vertically. The luminous tube denoted by the letter $m$, is circular and supported within the roof-shaped reflector $n$ of the device. The reflecting signs or lettering, as well as the figures, designs, or ornaments and ornament elements may be substantially the same as those referred to with regard to the disc-shaped carriers of Figs. 1 to 4.

For use with transmitted light, the cylinder or cone-shaped body is provided with perforations in the shape of designs, letters, elevations, and the like, and the source of light is arranged in its interior, so as to be able to project the rays of light through the perforations. An arrangement of such description being a very simple expedient which may be devised without difficulty as a modification of Fig. 10, it has not been shown separately in the drawings.

Figs. 12 to 14 illustrate a further modification in which the movable carrier is represented by an apron or screen adapted to be moved in a plane past an observation window of the apparatus. The apron is denoted by the letter $a^2$ and is trained over rollers $o$, one of which is driven by the electric motor $p$. The luminous tubes $q$ are arranged in front of the reflector $r$, or so as partly to be surrounded by the same. They produce the intermittent light for the luminous field in which the apron $a^2$ is adapted to move. The outer surface of the said apron, similar to the foregoing modifications, is made light-reflecting and may be provided with designs as in the aforedescribed examples.

If transmitted light is to be used, the apron will have to be provided with perforations or cuttings, as above stated, and the luminous tubes arranged as shown in Fig. 13 at $q$.

This arrangement for use with transmitted light is, on account of its strong lighting effect, especially suited for those cases in which the advertising displays must be recognizable from greater distance, as for example in outdoor installations at the fronts or upon the roofs of buildings.

It is also possible to combine the reflecting and the transmitted light arrangements in such a manner for example, that only one of the two arrangements will work at a time, while the other is automatically cut out by any known or convenient means.

The invention obviously is not confined to the shape and arrangement of the parts shown in the drawings, as other modifications and alterations may be resorted to without thereby departing from the scope of the invention. It is possible, for example, to make the rotating disc or carrier of two or more concentric parts which may be driven at different speeds or in mutually opposing directions, and the different speeds may be subjected to mutually different variations. If the movable body is a cylinder, it may be divided in a similar manner into several parts and these parts likewise may be driven at various speeds or in opposing directions.

As the speed at which the movable body or carrier, in whatever shape it may be, must be varied in order to bring about surprising illusions, the variations may be effected automatically as desired by other means than shown in Figs. 5 and 6. For instance, the driving electric motor may be temporarily cut off by an automatic switch until its speed of rotation has decreased to a certain extent, whereupon it is automatically switched on again. The regulation or variation of the speed may also be carried out in any other known manner electrically or mechanically as by means of suitable intermediate gearing. Instead of varying the number of rotations of the electric motor, the periodicity of the alternating current for the illumination of the tubes may be varied for example by automatically altering the rotary speed of the direct current converter by any known means. All these various methods are entirely incidental to the fundamental invention, and it is immaterial whether or not the intermittent luminous tubes are firmly connected to the stroboscopic device. Such might be the case when the luminous tubes are employed at the same time to serve some additional purpose, as for example, for the lighting of localities. In such cases the installation of a stroboscopic movement would be quite sufficient, provided of course, that the light of the luminous lighting tubes is sufficiently strong as to render a special concentration of the same unnecessary, and that the angle under which the light from the tubes illuminates the display matter is suitable.

Finally, the stroboscopic light and the form and color effects produced by the intermittent lighting are not confined to plane representations, but may also be produced in the form of plastic representations in space and thereby create entirely novel effects and illusions of a most varied kind. This may be carried out for example by attaching to the movable carrier solid imitations of the articles to be advertised, or the article itself, or block-type lettering, or any other bodily representations or ornaments, as indicated by the cigarette 118 upon the disk-shaped carrier 85 in Figs. 5 and 6. It will be understood that the cigarette shown may also be represented by an imitation on either a reduced or enlarged scale. In the same manner, other advertising articles such as lotion bottles, original packets of merchandise, fashion articles, household articles or machines as vacuum cleaners, and others, may be employed either in original or in natural, plain or colored plastic imitations. In this way, very surprising and highly effective stroboscopic multiplications and motion effects can be produced with the original articles, or their body representations, in their natural colors and configurations. Other plastic stroboscopic effects can be obtained by the provision upon the carrier, of colored plastic picture elements to produce plastic, movable and constantly changing ornaments, which will be of a highly attractive character. Thus, there may be simultaneuosly arranged upon one and the same carrier, colored plastic ornaments, plastic letters, and plastic designs or representations of real articles to be advertised and to therewith produce the surprising and colored plastic and motive effects which have been described and the production of which constitutes one of the main objects of this invention.

What I claim is:

1. The method of producing constantly changing advertising display, which consists in illuminating a body of suitable shape carrying plastic advertising representations standing clear thereof within an intermittent luminous field by means of individual flashes of light of short duration at a constant frequency, moving said body within said luminous field normally at a constant speed and varying the speed of movement thereof intermittently so as to thereby produce constantly changing stroboscopic effects such as illusionary multiplication of said plastic representations in space as well as temporary forward movements, standstills, and backward movements of the same.

2. A device for carrying out the described method of producing constantly changing advertising display, comprising means including luminous tubes for producing an intermittent luminous field at a constant frequency by intermittent light flashes of short duration, a movable body in said luminous field, display matter carried by said movable body, means for moving said body continuously and at constant speed within the luminous field, and means for varying the speed of said body's movement intermittently so as to produce moving and constantly changing stroboscopic effects, such as illusionary ornamental combinations, multiplications, temporary forward movements, standstills, and backward movements of the display matter.

3. A device for producing constantly changing advertising display, comprising a stationary set of luminous tubes, electric means for illuminating said tubes by intermittent current impulses at a constant frequency so as to cause said tubes to produce an intermittent luminous field, a movable carrier bearing display matter in said luminous field, said carrier being adapted to receive and reflect the rays emanating from said tubes, means for moving said carrier in the luminous field at a constant speed, and means for varying the speed of the carrier's movement intermittently so as to produce moving and constantly changing stroboscopic effects, such as illusionary ornamental combinations, multiplications, temporary forward movements, standstills, and backward movements of the display matter.

4. In a device for producing stroboscopic lighting effects, a set of stationary luminous tubes, means for imparting electric current impulses to said tubes for producing an intermittent luminous field by light flashes at constant frequency, a carrier movable in said luminous field, pictorial elements in disconnected arrangement on the carrier, means for moving the carrier at a constant speed to cause illusionary unison of said pictorial elements into complete ornaments, and means for varying the speed of the carrier's movement intermittently and independently of the frequency of the luminous field to thereby produce the illusion of said elements combining and discombining to new and constantly changing ornamental combinations.

5. In a device for producing stroboscopic lighting effects, a stationary set of luminous tubes, means for imparting electric current impulses to said tubes for producing an intermittent luminous field by light flashes at a constant frequency, a carrier movable in said luminous field, elevated portions such as letters, words, designs or other display matter on said carrier adapted to reflect light, means for moving the carrier at a constant speed within said luminous field, and means varying the speed of the carrier's movement intermittently and independently of the frequency of the luminous field to thereby cause illusionary multiplication and movement of said elevated portions.

6. In a device for producing stroboscopic lighting effects, a stationary and preferably inertialess course of intermittent lighting producing a luminous field by individual flashes of light from an electrical source at a constant frequency, means for generating electric impulses in said source of light, means for controlling or varying the time of duration of the light flashes, a carrier bearing light-reflecting display matter movable in said luminous field, means for moving the carrier at a constant speed within said luminous field and means for varying its speed of movement intermittently.

7. In a device for producing stroboscopic lighting effects, stationary luminous tubes for producing an intermittent luminous field by light flashes at a constant frequency, means for electrically energizing said tubes at desired frequency, an electric spark gap arrangement for controlling or varying the time of duration of each of the light flashes of the luminous field, a carrier bearing light-responding display matter movable in said luminous field, means for moving the carrier at a constant speed within said luminous field and means for varying its speed of movement intermittently and independently of the frequency of the luminous field.

8. In a device for producing stroboscopic lighting effects, stationary luminous tubes for producing an intermittent luminous field by light flashes at a constant frequency, means for supplying direct current electric energy to said luminous tubes at desired frequency, a circuit interrupter, means for subsequently transforming the circuit up to the working tension of the luminous tubes, a carrier bearing light-responding display matter movable in said luminous field, means for moving the carrier at a constant speed within said luminous field and means for reducing its speed of movement intermittently.

9. In a device for producing stroboscopic lighting effects, luminous and preferably inertialess tubes for producing an intermittent luminous field by electric light flashes at constant frequency, a disc-shaped carrier adapted to rotation in said luminous field, light-responding display matter carried by said carrier, means for rotating said disc at a constant speed within the luminous field, and means for varying the speed of said carrier's rotation intermittently.

10. In a device for producing stroboscopic lighting effects, luminous and preferably inertialess tubes for producing an intermittent luminous field by electric light flashes at a constant frequency, a carrier having a continuous surface rotatably arranged in said luminous field, means for rotating said carrier within said luminous field at constant speed, and means for varying the speed of the carrier's rotation intermittently and independently of the frequency of the intermittent luminous field.

11. A device for producing stroboscopic lighting effects comprising a casing having an open front, luminous tubes of suitable frequency arranged in said casing around said open front and adapted to produce a luminous field within the space of the casing adjacent said front at a constant frequency, a reflector in said casing concealing the luminous tubes from sight, a carrier having a continuous surface adapted for movement in the space of said open front, light-responding display matter on the surface of said carrier, means for moving said carrier in said luminous field at a constant speed with its surface visible through said open front and means for varying its speed of movement intermittently and independently of the frequency of the luminous field.

12. In a device for producing stroboscopic lighting effects, a set of arc-shaped stationary luminous tubes of different colors adapted to produce a colored luminous field by light flashes at a constant frequency, means for supplying electric impulses to said tubes at desired frequency, a carrier bearing light-responding display matter, means for moving said carrier at a constant speed within said luminous field and means automatically operable to retard the speed of the carrier's movement intermittently.

13. In a device for producing stoboscopic lighting effects, an arrangement of inertialess luminous tubes for producing a luminous field by light flashes at a constant frequency, means for supplying electric impulses to said tubes at desired current frequency, a carrier movable in said luminous field, plastic representations of articles carried by said carrier, means for moving said carrier at a constant speed within said luminous field so as to cause the intermittent light from the luminous tubes to be reflected from said plastic representations, and means for varying the speed of said carrier's movement intermittently and independently of the frequency of the luminous field so as to cause changing effects of illusionary standstill and forward and backward movement of said plastic representations in space.

In testimony whereof I affix my signature.

AUGUST ABEL.